United States Patent Office 3,267,023
Patented August 16, 1966

3,267,023
HYDROCRACKING WITH A CRYSTALLINE ZEOLITE ADMIXED WITH A DEHYDROGENATION CATALYST
Joseph N. Miale, Trenton, N.J., and Paul B. Weisz, Media, Pa., assignors to Mobil Oil Corporation, a corporation of New York
No Drawing. Filed June 8, 1964, Ser. No. 373,532
12 Claims. (Cl. 208—111)

This application is a continuation-in-part of our application Serial No. 39,868, filed June 30, 1960, now U.S. Patent No. 3,136,713.

This invention relates to a method of carrying out an exothermic hydrocracking reaction and an endothermic reaction in a reaction zone wherein the heat evolved in the exothermic hydrocracking reaction is utilized to effect the endothermic reaction. More particularly, this invention relates to an exothermic hydrocracking reaction involving a fluid charge containing a component capable of undergoing both cracking and hydrogenation, a hydrocracking catalyst for such exothermic reaction, and hydrogen, and to the utilization of the heat evolved from the foregoing exothermic hydrocracking reaction to effect the desired endothermic reaction.

In our application Serial No. 39,868, filed June 30, 1960, there is described a method for internally heating a catalytic reaction zone wherein an endothermic reaction such as catalytic cracking of a fluid charge is carried out, which method involves introducing into the reaction zone, along with the fluid charge being subjected to cracking and the cracking catalyst, a combustible fuel component, oxidant therefor, and a crystalline aluminosilicate having rigid three dimensional networks bearing within the interior thereof catalytic oxidation surfaces and having uniform interstitial dimensions which are sufficiently large to admit the oxidant and the fuel component, but are sufficiently small to exclude the fluid charge which is to be subjected to cracking, so that the fuel component is contacted with the catalytic oxidation surfaces and combusted, to thereby raise the temperature of the reaction zone sufficiently high to effect catalytic cracking of the fluid charge. Thus, our foregoing application discloses an exothermic reaction, combustion, and an endothermic reaction, cracking of a fluid charge, wherein the heat evolved in the exothermic reaction is utilized to effect the endothermic reaction.

We have now discovered that exothermic hydrocracking reactions can be carried out to evolve heat, which heat can be utilized to effect a desired endothermic reaction. We have additionally discovered that endothermic reactions other than cracking can be maintained by the heat evolved from the exothermic reaction.

In accordance with our invention, a method is provided for effecting an exothermic reaction and an endothermic reaction in a single reaction zone, which method comprises introducing into the reaction zone a fluid charge capable of undergoing an endothermic reaction, a catalyst for such endothermic reaction, a fluid charge containing a component capable of undergoing an exothermic hydrocracking reaction (involving both cracking and hydrogenation), a catalyst for such exothermic hydrocracking reaction, and hydrogen, and regulating the proportions of the foregoing charges such that the heat evolved from the exothermic hydrocracking reaction serves to maintain the reaction zone at a temperature sufficient to sustain the endothermic reaction.

Considering the hydrocracking reaction, the fluid charge may contain components of aromatic, naphthenic, and/or aliphatic hydrocarbons. The hydrocarbon must contain at least two carbon atoms, preferably contains at least five carbon atoms, and more preferably contains from about eight to forty carbon atoms. Branched and/or straight chain paraffins may, of course, be utilized.

The hydrocracking reaction involves both a cracking of the initial hydrocarbon reactant and a hydrogenation of the fragments produced by such cracking. While the cracking aspect of the hydrocracking is endothermic in nature, the hydrogenation aspect is exothermic. Moreover, the heat evolved from such exothermic hydrogenation is greater than the heat required for the cracking, so that the net result is an evolution of heat for the entire hydrocracking reaction, i.e., it is exothermic in nature.

The catalysts for the hydrocracking reaction generally are known as duo-functional catalysts in that they contain constituents of the "acid" type and of the "metal" type.

Suitable "acid" catalysts include silica-metal oxides such as silica-alumina, silica-magnesia, etc.; halogenated aluminas such as fluorine on alumina, chlorine on alumina, etc.; halides of metals from Groups III and IV of the Periodic Table such as aluminum chloride and the like; crystalline aluminosilicate zeolites including hydrogen zeolites, metal hydrogen zeolites such as rare earth X and Y zeolites, rare earth hydrogen X and Y zeolites, hydrogen or rare earth activated natural zeolites as erionite, chabazite, offretite, mordenite, etc. Additional zeolites which would be suitable are described in Frilette et al., application Serial No. 161,241, filed December 26, 1961, now U.S. Patent No. 3,140,251.

Acid catalysts of the crystalline aluminosilicate zeolite type are characterized by pores having a substantially uniform pore diameter. If this pore diameter is of a certain magnitude, e.g., 5 angstrom units, then the catalyst will exhibit "shape selectivity" in that it will permit entry to its interior of straight chain (linear) molecules but will exclude branched molecules.

In order to introduce hydrogen into such a zeolite without destroying the characteristic pore structure, it has been found that the atomic ratio of silicon to aluminum in the zeolite should preferably be greater than about 1.8, and preferably in excess of 2.5. Thus, erionite and chabazite each contain pores of a uniform pore diameter of 5 angstrom units. Erionite, however, has an atomic ratio of silicon to aluminum equal to 3.0, whereas for chabazite the ratio is 2.0. Hydrogen can be introduced into either of these zeolites. Thus, hydrogen erionite can be obtained by direct base exchange of erionite with an aqueous acid such as HCl because of the relative high atomic ratio of 3.0. Hydrogen chabazite can also be obtained, but because of its lower atomic ratio of 2.0 it is preferable to first exchange the chabazite with aqueous ammonium chloride solution to introduce ammonium ions, followed by heating to drive off ammonia, rather than to exchange directly with an acid. (The effect of the silicon-aluminum atomic ratio in a given zeolite upon the ease of introduction of hydrogen ions thereto is discussed in detail in Plank et al. application Serial No. 235,141 filed November 2, 1962, now abandoned.)

"Metal" catalysts include those metals and metal compounds wherein the metal is a transition metal selected from Groups V–VIII of the Periodic Table; periods 4–6. Included among such transition metals are vanadium, chromium, manganese, iron, cobalt, nickel, platinum and palladium metals, and tungsten.

The metal catalyst may be in the form of free metal such as nickel powder, platinum sponge, or the like, or as a powdered metal compound such as partially reduced iron oxides. Frequently the metal catalyst is impregnated upon a carrier such as silica, alumina, pumice, clay, asbestos, etc. Where the metal catalyst is employed in the form of a metal compound rater than free metal it may be an oxide, or a salt such as a sulfide, chromite, tungstate, etc.

In many instances it is desirable that the catalyst be shape selective. Shape selectivity is generally achieved by selecting an appropriate crystalline aluminosilicate zeolite and introducing the desired acid or metal catalyst therein by whatever technique is most suitable, e.g., impregnation, ion exchange, or "growing" the crystalline zeolite in the presence of the metal. This latter technique involves introducing into a mixture of components capable of forming a crystalline aluminosilicate zeolite a minor proportion of the desired metal or metal ions and thereafter growing the crystalline zeolite to thereby "trap" the metal therewithin. This procedure is described in detail in Frilette et al. application Serial No. 316,369, filed October 29, 1963, now abandoned.

The hydrocracking reaction may be carried out at a temperature of from about 0 to 600° C. and at atmospheric pressure, although higher pressures are usually desired, e.g., 500 to 4000 p.s.i. A more preferred temperature range is from about 250 to 550° C.

As already noted, the foregoing hydrocracking reaction is exothermic in nature, and the heat evolved therefrom is utilized to effect and sustain the desired endothermic reaction.

The endothermic reaction may comprise cracking (which also includes dealkylation and deamination), dehydration, dealkylation, dehydrogenation, dehalogenation, dehydrohalogenation, steam reforming, etc. (Suitable endothermic reactions and examples thereof are further described in our copending application entitled "Method of Heat Balancing," Serial No. 373,485, filed of even date herewith, the contents of such copending application being incorporated by reference herein.) Of course, the endothermic reaction must be so selected as to be compatible with the exothermic hydrocracking reaction that is contemporaneously being carried out. Thus, the endothermic and exothermic reactions should not interfere with one another.

It will be apparent that the temperature at which the single reaction zone is maintained must be one wherein both the exothermic hydrocracking reaction and the endothermic reaction will proceed.

Considering the various endothermic reactions, the following temperature ranges are generally satisfactory: for dehydration, from 100 to 600+° C.; for dehydrogenation, from about 400 to 600+° C.; for dehalogenation and dehydrohalogenation, from about 200 to 600+° C.; for cracking (which also includes deamination and dealkylation), from about 200 to 600° C.; for steam reforming, from about 300 to 600+° C.

As previously noted, the exothermic and endothermic reactions which are contemporaneously carried out in the reaction zone must not interfere with one another. This may be accomplished by utilizing two distinct types of catalytic sites, one type for the exothermic reaction and another for the endothermic reaction. The two catalysts exhibiting such distinct catalytic sites may be in the form of a composite granule or may be added as a mixed charge to the reaction zone. In any event, they are in thermal contact with one another.

It is frequently desirable to employ a shape-selective catalyst for one or both of the reactions, as illustrated in the examples hereinafter.

For instance, a shape selective hydrocracking catalyst can be employed which will admit only n-aliphatics and hydrogen and will thus effect an exothermic hydrocracking to lighter hydrocarbons, but will exclude more complex molecules such as cyclohexane, so that cyclohexane can, in the same reaction zone wherein the foregoing exothermic hydrocracking reaction is taking place, be treated with a dehydrogenation catalyst to effect endothermic dehydrogenation to produce hydrogen and benzene. This is illustrated in Example 1 hereinafter.

As already noted, a shape selective catalyst may be obtained by depositing within the pores of a crystalline aluminosilicate structure an appropriate metal or compound thereof capable of catalytically promoting hydrogenation. Deposition of the meal within the crystalline aluminosilicate may be accomplished by growth of the aluminosilicate crystals in a solution containing an ion of such metal. Thus, suitable crystalline inorganic aluminosilicates containing metal distributed within the pores thereof may be produced by effecting the growth of crystals of the aluminosilicate from an aqueous mixture containing a water-soluble ionizable metal compound, dehydrating the resulting metal containing crystalline product and subjecting the same to a thermal treatment at an elevated temperature. The resulting product comprises metal dispersed within the pores of the crystalline aluminosilicate structure characterized by rigid three dimensional networks and an effective pore diameter within the approximate range of about 4 to about 7 angstroms. An effective crystalline aluminosilicate having a platinum metal distributed within its uniform structure may be prepared, as described in Frilette et al. application Serial No. 319,639, filed November 29, 1963, by introducing into an aqueous reaction solution having a composition, expressed as mixtures of oxides, within the following ranges $SiO_2/Al_2O_3$ of 0.5 to 2.5, $Na_2O/SiO_2$ of 0.8 to 3.0 and $H_2O/Na_2O$ of 35 to 200, a minor proportion of a water-soluble ionizable platinum metal compound, inducing crystallization of the resulting reaction mixture by subjecting the same to hydrothermal treatment, replacing sodium ions of the resulting crystalline product with calcium, dehydrating the material so obtained and thermally treating at a temperature in the approximate range of 250° F. to 1100° F. to effect at least partial conversion of the platinum metal-containing ion to a catalytically active state, thereby yielding a resulting composition having platinum metal dispersed within the pores of a crystalline aluminosilicate characterized by rigid three dimensional networks and uniform pores approximately 5 angstroms in diameter.

Aside from introducing the metal into the aluminosilicate structure during the process of crystal growth, such metal may be deposited within the interior of the crystalline aluminosilicate by base-exchange of an initially formed alkali metal or alkaline earth metal aluminosilicate with a solution containing an ion of the desired metal. Utilizing this manner of operation, it is generally desirable to remove active catalytic hydrogenation surfaces attributable to deposition of the metal ion on the outer surface of the crystalline aluminosilicate lattice by either of two methods. One method utilizes the effect of additional base-exchange treatment with a solution containing an ion of size too large to enter the cavities, but effective in exchanging catalytically active to catalytically inactive ions in all external locations. Another method relies on contacting the base-exchanged material with a substance capable of poisoning the active ions externally but incapable of reaching and thus effecting the active sites located within the cavities. By whatever method may be employed, the catalytic hydrogenation surface is caused to be contained only within the crystalline pore structure and to thereby afford a resulting product capable of effecting desired selective catalytic hydrogenation.

Crystalline alkali metal and alkaline earth metal aluminosilicates employed in preparation of the metal-containing composites described herein are essentially the dehydrated forms of crystalline natural or synthetic hydrous siliceous zeolites containing varying quantities of alkali or alkaline earth metal and aluminum. The alkali or alkaline earth metal atoms, silicon, aluminum and oxygen in these zeolites are arranged in the form of an aluminosilicate salt in a definite and consistent crystalline pattern. In general, the process for preparing such aluminosilicates involves heating, in aqueous solution, an appropriate mixture of oxides, or of materials whose chemical composition can be completely represented as a mixture of oxides $Na_2O$, $Al_2O_3$, $SiO_2$ and $H_2O$ at a temperature of approximately 100° C. for periods of 15 minutes to 90 hours or more. The product, which crystallizes within this hot mixture is separated therefrom and water washed until the water in equilibrium with the zeolite has a pH in the range of 9 to 12 and thereafter is dehydrated by heating. Usually, an alkali metal silicate serves as the source of silica and an alkali metal aluminate as the source of alumina. An alkali metal hydroxide is suitably used as the source of the alkali metal ion, and, in addition, contributes to the regulation of the pH. All reagents are preferably soluble in water. Generaly, a sodium aluminosilicate is employed. Preferably, the reaction solution has a composition expressed as mixtures of oxides within the following ranges $SiO_2/Al_2O_3$ of 0.5 to 2.5, $Na_2O/SiO_2$ of 0.8 to 3.0.

The following examples will further illustrate our invention.

*Example 1*

This example utilizes the hydrocracking of hexane to lighter hydrocarbons, predominantly methane, as the exothermic hydrocracking reaction, the heat derived therefrom serving to sustain an endothermic dehydrogenation reaction.

The hydrocracking catalyst is a modified A-zeolite. The A-zeolite is well known and is described in U.S. Patent 2,882,243. The A-zeolite is modified to the calcium form by base exchanging with an aqueous solution containing both calcium and nickel ions until the total nickel content is about 8 percent by weight. The resulting catalyst is shape selective in that it is characterized by pores having a substantially uniform pore diameter of 5 angstrom units. Such a catalyst will admit straight chain molecules such as n-hexane and hydrogen to its interior, but will exclude more complex molecules such as cyclohexane.

The endothermic dehydrogenation reaction employs cyclohexane as the initial reactant. The hydrogenation catalyst is a typical platinum reform catalyst, platinum deposited on alumina. (See, e.g., U.S. Patents 2,479,109 and 2,479,110.)

The recation system may be illustrated as follows:

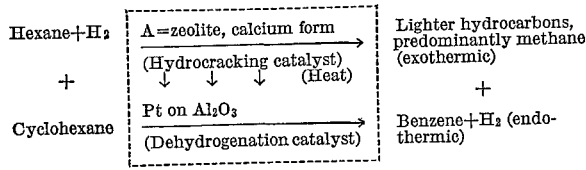

The foregoing reactions are carried out in a single reaction zone containing a mixture of the two types of catalyst particles. The reactions are carried out at atmospheric pressure and at a temperature of 850° F. with a vapor residence time of about 10 seconds.

The hydrocracking of hexane to lighter hydrocarbons proceeds to a conversion in excess of 20 percent. The proper heat balance as between the exothermic hydrocracking reaction and the endothermic cracking reaction is maintained by appropriate adjustment of the hexane feed. Of course, the heat balance may also be maintained by adjustment of the hydrogen feed or the cyclohexane feed. It will be noted that the dehydrogenation of cyclohexane produces both benzene and hydrogen. Such hydrogen may, if desired, be separated and recycled for use with the hexane in the exothermic hydrocracking reaction.

*Example 2*

This example is similar to Example 1, however, rather than utilizing hexane as the initial reactant for the hydrocracking reaction, a light naphtha fraction from a straight run petroleum distillate or from a reformer effluent is employed. Since the hydrocracking catalyst is shape selective it will exclude from its interior all branched components of the light naphtha fraction and will admit only normal hydrocarbon components. Such normal hydrocarbons will be hydrocracked. The remainder of the light naphtha fraction, containing branched rather than straight hydrocarbon components, has a considerably increased octane number.

*Example 3*

This example is similar to Example 1 insofar as the exothermic hydrocracking reaction, but utilizes as the endothermic reaction a dehydrohalogenation rather than the dehydrogenation of Example 1. Thus, the initial reactant for the endothermic reaction is isobutylchloride rather than cyclohexane. The catalyst for the endothermic dehydrohalogenation reaction is the sodium form of Y-zeolite and is characterized by pores having a substantially uniform pore diameter of 13 angstrom units.

The reaction system may be illustrated as follows:

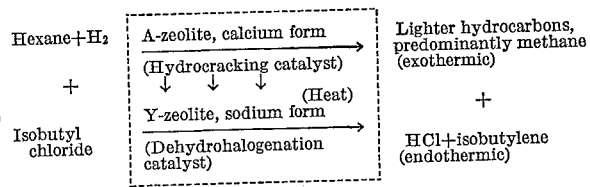

The foregoing reactions are carried out in a single reaction zone containing a mixture of the two types of catalyst particles. The reactions are carried out at atmospheric pressure and at a temperature of 700° F. with a vapor residence time of about 10 seconds. The hydrocracking of hexane to lower molecular weight paraffins proceeds with a conversion in excess of 20 percent.

The proper heat balance is readily obtained by appropriate adjustment of the hexane feed stream.

*Example 4*

This example is similar to Example 3, however, n-octane rather than hexane is employed as the charge to be hydrocracked. The hydrocracking catalyst differs from that employed in Example 3 in that an A-zeolite, platinum form, is used, this catalyst containing 0.5 weight percent platinum. Such catalyst is readily prepared as described in column 4 herein. Results are obtained which are substantially similar to those described in Example 3.

Variations can, of course, be made without departing from the spirit of our invention as embodied in the foregoing specification.

Having thus described our invention, what we desire to secure and claim by Letters Patent is:

1. A method of effecting an exothermic hydrocracking reaction and an endothermic reaction in a single reaction zone comprising introducing into said zone (1) a hydrocracking catalyst of a shape selective crystalline aluminosilicate zeolite characterized by pores having a substantially uniform diameter not exceeding about 5 angstrom units, (2) a fluid charge comprising hydrogen and a component capable of entering into the pores of said catalyst and undergoing an exothermic hydrocracking reaction, (3) a solid porous catalyst for an endothermic reaction, and (4) a fluid charge capable of undergoing an endothermic reaction but incapable of entering into the pores of said hydrocracking catalyst, and regulating the proportions of the foregoing charges such that the heat evolved from said exothermic hydrocracking reaction serves to maintain said reaction zone at a temperature sufficient to effect and sustain said endothermic reaction.

2. The method of claim 1 wherein said component capable of undergoing said exothermic hydrocracking reaction contains at least two carbon atoms and is selected from the group consisting of aromatic hydrocarbons, naphthenic hydrocarbons, and aliphatic hydrocarbons.

3. The method of claim 2 wherein said hydrocarbon component contains from about 8 to 40 carbon atoms.

4. The method of claim 1 wherein said endothermic reaction constitutes dehydrogenation of a hydrocarbon.

5. The method of claim 1 wherein said endothermic reaction constitutes cracking of a hydrocarbon to lower boiling fractions.

6. The method of claim 1 wherein said endothermic reaction constitutes dehydration of an alcohol to produce water and an olefin.

7. The method of claim 1 wherein said endothermic reaction constitutes dealkylation of a hydrocarbon.

8. The method of claim 1 wherein said endothermic reaction constitutes dehalogenation of a halogenated hydrocarbon.

9. The method of claim 1 wherein said endothermic reaction constitutes deamination of an amine to produce an olefin and ammonia.

10. The method of claim 1 wherein said endothermic reaction constitutes dehydrohalogenation of a halogenated hydrocarbon to produce an olefin and a hydrogen halide.

11. The method of claim 1 wherein said endothermic reaction constitutes dehydrogenation of a naphthenic hydrocarbon.

12. The method of claim 1 wherein said endothermic reaction constitutes dehydrohalogenation of a branched alkyl halide to produce hydrogen halide and an olefin.

References Cited by the Examiner

UNITED STATES PATENTS

| | | | |
|---|---|---|---|
| 2,962,435 | 11/1960 | Fleck et al. | 208—120 |
| 2,983,670 | 5/1961 | Seubold | 208—110 |
| 3,039,953 | 6/1962 | Eng | 208—26 |

DELBERT E. GANTZ, *Primary Examiner.*

ALPHONSO D. SULLIVAN, *Examiner.*

A. RIMENS, *Assistant Examiner.*